United States Patent [19]

Garland

[11] Patent Number: 5,189,694
[45] Date of Patent: Feb. 23, 1993

[54] TELEMETRY ACCESS ARRANGEMENT

[75] Inventor: Stuart M. Garland, Morton Grove, Ill.

[73] Assignee: AT&T Bell Laboratories, Murray Hill, N.J.

[21] Appl. No.: 576,542

[22] Filed: Aug. 31, 1990

[51] Int. Cl.$^5$ ............................................. H04M 11/00
[52] U.S. Cl. ..................................... 379/106; 379/107; 379/92
[58] Field of Search ............... 379/107, 106, 105, 104, 379/102, 92

[56] References Cited

U.S. PATENT DOCUMENTS

| | | |
|---|---|---|
| Re. 29,499 | 12/1977 | Spencer . |
| 3,868,640 | 2/1975 | Binnie et al. ........................ 340/151 |
| 3,899,639 | 8/1975 | Cleveley et al. ..................... 379/106 |
| 3,922,492 | 11/1975 | Lumsden . |
| 4,008,458 | 2/1977 | Wensley .............................. 340/151 |
| 4,646,342 | 2/1987 | Hargrave et al. ..................... 379/106 |
| 4,691,344 | 9/1987 | Brown et al. ........................ 379/106 |
| 4,804,957 | 2/1989 | Selph et al. ..................... 340/870.03 |
| 4,850,010 | 7/1989 | Stanbury et al. .................... 379/107 |
| 4,856,047 | 8/1989 | Saunders .............................. 379/57 |

FOREIGN PATENT DOCUMENTS

| | | |
|---|---|---|
| 0313453 | 10/1988 | European Pat. Off. . |
| 0339697 | 3/1989 | European Pat. Off. . |
| 0343089 | 5/1989 | European Pat. Off. . |
| B65948 | 4/1986 | PCT Int'l Appl. . |
| WO8607222 | 4/1986 | PCT Int'l Appl. . |
| WO8908959 | 9/1989 | PCT Int'l Appl. . |
| 2099260 | 12/1982 | United Kingdom ................. 379/107 |

OTHER PUBLICATIONS

M. Kurachi et al., "New Telecommunications Service for Telemetering", *International Conference On Computer Communication*, Nov. 1984, pp. 219-223.
F. Kruger, "TEMEX erschliesst neue Markte", *Net-Nachrichten Elektronik Und Telematik*, vol. 42, No. 5, May 1988, pp. 212-216.
"Introduction to Off-Talk Communication Services", Steve Nakanishi FTEL, Paris, Nov. 13-14, 1989.
Ameritech Technical Reference, AM TR-MK-T-000035, Ameritech Standard, Issue 1, Mar. 1989 "Automatic Meter Reading Services Interface Specifications".
M. Suzuki, "Automatic Meter Reading at Tokyo Gas", *Proceedings, Automatic Meter Reading Association*, 4th Annual Symposium, Boston, Sep. 22-27, 1991, pp. 97-104.
K. Kanai et al., "Automatic Remote Meter Reading System", *Japan Telecommunications Review*, Oct. 1979, pp. 378-384.
C. Cohn, "Computer Reads On-Location Meters by Using No-ring Phone Circuits on Existing Lines", *Electronic*, Jan. 27, 1983, pp. 71, 72.
K. Shirai et al. "Remote Automatic Meter Reading & Telecontrol System Using Telephone lines", *NEC Research & Development*, No. 65, Apr. 1982, pp. 82-92.

*Primary Examiner*—James L. Dwyer
*Assistant Examiner*—Wing F. Chan
*Attorney, Agent, or Firm*—Werner Ulrich

[57] ABSTRACT

This invention relates to a method and apparatus for accessing customer meters and for controlling customer devices over a telephone line. A suppressed ringing connection is established over a customer line between a central office and customer station equipment. The connection is between a data accessing device such as a meter reading controller and a customer premises device such as a meter interface unit. Signals are exchanged over the connection between these two units without alerting the customer via a ringing signal and without changing the supervisory state of the customer's station equipment from on-hook. The connection can also be used for controlling devices such as air conditioning units, in order, for example, to avoid overloads in a power distribution system. The voice switching network of the central office is used for making the connection between the meter control unit and the meter interface unit. Advantageously, this arrangement can allow a large number of utility meters and controlling devices to be accessed remotely using existing telephone plant.

19 Claims, 4 Drawing Sheets

TELEMETRY ACCESS ARRANGEMENT

TECHNICAL FIELD

This invention relates to a method and apparatus for accessing customer meters and for controlling customer devices over a telecommunications line.

PROBLEM

There has long been a need for reading utility meters periodically, a need which in the past has been met largely through manual arrangements. More recently, there has also been a growing desire by the electric power utilities to be able to control consumer electric loads as a means of forestalling brownout and blackout situations. This need has been met with only partial success in the prior art by telemetering arrangements associated with telephone customer line access and by the use of carrier systems connected to power distribution lines. In these arrangements, utility meters at a telephone customer's home or business are accessed via the telephone customer's line when that line is not being used for telephone calls. The method of accessing the line is to have a direct metallic path between the customer's meter reading interface and a service unit at the central office for monitoring and controlling the off-hook/on-hook supervisory state of the customer. Access from the central office switch to the customer is provided through the use of a no-test trunk, i.e., a trunk which can access a customer's line even when that line is already in the off-hook state. The trunk uses a no-test connection, i.e., a special metallic connection that bypasses the normal switched telephone connection and connects without making a busy test. This metallic connection passes direct current signal. The no-test trunk is used to get access to the meters without ringing the customer's line, the latter action being performed on all conventional telephone connections. The meter is then triggered to respond by being sent signals over the no-test connection, each signal consisting of a burst of tone of one of thirteen frequencies in the telephone voice band. Using this arrangement, a connection is established to the customer's line, the service unit makes a test whether the customer is busy, and, if the customer is not busy, the service unit is connected to the customer's meter interface. The meter interface is primed (alerted) by one of the thirteen frequencies to respond to data signals originating from the service unit or a controller at the utility, transmitted via the service unit. These data signals may be either in the form of dual tone multifrequency (DTMF) signals or frequency shift keyed binary data signals. Following the alerting of the meter interface unit, there is an exchange of signaling information between the controller and the meter interface unit, the signaling exchange being used for triggering the reading of meters, for transmitting the present reading of the meters, for returning the present status of these meters, or for controlling a device such as an air conditioner at the called customer's residential or business location. The latter function allows a power company to control its peak load by temporarily shutting down, possibly on a rotating basis, a portion of the air conditioners being served. The actual reading of the meters is performed by a reading mechanism that interfaces with the meter interface used. Meter status information includes indications of customer tampering, low battery, or other indications of a need for servicing. After a complete cycle of meter readings and/or device control operations has been completed, the no-test connection is dropped and the customer is enabled to originate new calls.

While the customer's line is connected to the service unit, supervision of the customer's line is performed by the central office service unit (C.O. service unit) which is connected by a metallic access connection that provides current sensing supervision from a central office service unit. In modern digital switching systems, such as the 5ESS® switch manufactured by AT&T, and described in *The AT&T Technical Journal*, July/August 1985, no metallic access connection is provided through the voice network, so that a no-test trunk is required for monitoring direct current supervisory signals. If the customer's telephone station goes off-hook, a direct current in excess of 20 milliamperes is detected by the C.O. service unit and the central office service unit disconnects the telemetry call. In some cases, the supervision is performed from the customer's meter interface unit which transmits a disconnect signal to the central office service unit to disconnect the telemetry call.

There are a number of disadvantages to this arrangement. The no-test trunk is a facility available in very small numbers in a central office, the number being limited by the no-test access arrangements. No-test trunks are used primarily for checking on customers whose lines are reported as being busy for too long a time, making tests of the resistance between the two wires of a customer line, and manual testing of a line. In a typical switch, such as the 5ESS switch, only two no-test trunks are available in an entire switch, which may serve up to several hundred thousand customer lines. In a typical meter reading cycle the time required for meter readings and/or device control operations may vary from 10 to 20 seconds. Clearly, two no-test trunks are inadequate to serve the meter reading and device control needs of all the customers of the 5ESS switch. Further, the requirement for a direct metallic path in order to provide current sensing supervision makes it difficult to access lines which are not connected directly to a switch but are connected through a subscriber line carrier system, such as the SLC 96 (Subscriber Line Carrier) manufactured by AT&T, since such SLC systems do not provide a metallic path for a normal voice connection. Further, billing records for such no-test trunk calls are made separately from the billing records for voice or data calls, thus creating administrative problems. Further, in prior art arrangements, if a customer wishes to originate a call while the meter reading is taking place, there are some arrangements in which the customer is blocked until the reading is completed and other arrangements in which the customer is blocked for a period of 1 to 2 seconds until the no-test connection can be dropped.

Because of the small number of no-test trunks and limited no-test access, and the fact that the no-test trunks are needed for their primary intended purposes, the number of meters which may be monitored and devices which may be controlled is much smaller than the number of such meters and devices served by a typical large local central office. It is costly to add substantial numbers of extra no-test trunks, in a digital switch such as the 5ESS switch which does not provide a metallic access voice switching network, because the metallic access unit provided for such no-test trunks is expensive. A problem of the prior art, therefore, is that there is no arrangement available which permits a large central office, especially a digital central office which does not provide a direct metallic path for telephone connections, to access a large number of meter reading and device control interfaces within a reasonable period over the customer lines connecting that central office to the telephone stations and the remote metering devices.

SOLUTION

The above problem is solved, in a departure from the prior art by providing, for example, arrangements wherein a standard interoffice trunk, controllable by special software of the connected switching system, is used for accessing, over an analog customer line, a customer's premises device such as a meter interface unit (MIU) from a data access device, such as a utility meter reader/device controller; this standard trunk is then connectable to the customer's line via a suppressed ringing connection through the communication signal switching network, used, for example, for voice signals, in order to access the customer's analog line, connected to the MIU. Advantageously, such an arrangement makes it possible to use a plurality of circuits for accessing different meter interface units at the same time and without requiring additional expensive specialized no-test trunks.

Modern digital switching systems, such as the 5ESS switch, do not provide a metallic connection that can pass direct current signals; metallic access facilities are expensive in digital switches because they bypass the digital network which is used for passing speech signals for telephone conversations. The switching network need not provide a metallic access from the C.O. service unit to the line because supervision is detected at the line circuit, an interface between the switching network and the customer line, and is passed by the software controlled processors of the switch to the connected trunk, which passes supervision to the C.O. service unit. Trunks such as the well-known E & M trunks or trunks using common channel signaling have arrangements for communicating a change in supervisory state at one end to the other end of the trunk. These arrangements are used to transmit customer supervisory state changes to the C.O. service unit so that the unit may disconnect if a customer goes off-hook.

In the prior art, the only way of getting access to a customer's line using the standard switching network or switch fabric was to ring the customer's line, and to monitor supervision from a line circuit in the switch. In a departure from the prior art, a new type of call connection is made in which ringing is suppressed in order to avoid alerting the customer; supervision is monitored by the switch and transmitted via the software controlled processors and trunk supervisory signal transport techniques to a monitoring central office unit. The meter interface unit is alerted without ringing the customer's line from a connection through the standard switch fabric of the central office by providing a new class of service for calls from the utility, the new class of service being characterized by a connection made without such ringing. In this case, the class of service is a class of service of the caller and affects the nature of the call being set up. The meter interface unit is alerted that a connection to the meter interface is desired by a tone sent to the interface unit by the C.O. service unit, or, alternatively, by the utility controller through the service unit. The interface unit receives these tones while in the on-hook state and processes them without sending an off-hook signal back to the central office.

Billing records are made in the normal way that billing records are made for calls through the switching network. Advantageously, this type of call connection can use the normal switch fabric for accessing a customer line, while also providing the absence of ringing necessary to access the meter interface unit without disturbing the customer, and while continuing to use normal customer supervision from the switch.

Present-day subscriber line carriers (SLCs) will not set up a connection unless they detect ringing. An exception to this rule is for a connection from a no-test trunk wherein a special tone is provided which is recognized by the subscriber line carrier and which will then provide a metallic bypass of the SLC. In accordance with one aspect of the invention, when a meter interface unit access call is set up through a subscriber line carrier, a brief burst of ringing is applied on that connection. In response to that brief burst of ringing, the subscriber line carrier sets up a connection within its own switch fabric to the called customer whose meter interface unit is being accessed. The burst of ringing is sufficiently short that the subscriber line carrier which repeats any ringing signals that it detects on its input, will not in fact repeat any ringing signal to that customer's line, thus, avoiding disturbing the customer when only the meter interface unit is being accessed.

A central office service unit interfaces between a utility controller, such as a personal computer, at the utility and the meter interface unit connected through the voice signal switching network. Responsive to signals from the utility controller, the central office service unit signals the switch with the identification of the called customer to set up a suppressed ringing connection to the desired meter interface unit. The central office service unit or utility controller transmits alerting signals to the meter interface unit. The central office service unit detects off-hook signals from the switch in order to signal for a premature disconnect, and responds to a meter interface unit disconnect signal to signal the switch for a disconnect of the meter reading and/or device control connection. The central office service unit has a plurality of interoffice trunks for communicating with customers connected to other switching systems and for communicating simultaneously for reading several meters in parallel for customers in these switching systems; it also is connectable to a plurality of utilities for simultaneous use over different trunks.

In accordance with one aspect of the invention, for an Integrated Services Digital Network (ISDN) station connected via a Primary Rate Interface or a Basic Rate Interface, and a digital line, the D-channel is used for communicating with the meters and controllable devices. This also permits the communication signal switching network to be used for providing access to the customer's lines and allows the high bandwidth (64 or 16 kb./sec.) D-channel to be utilized for communications with the meters and devices. Here, supervision is detected at the customer premises and is transmitted by data signals over the D-channel.

Accordingly, this invention provides a method and apparatus for accessing customer premises devices from a data access device by using a suppressed ringing connection through a voice signal switching network of a telecommunications switching system.

DETAILED DESCRIPTION

Figure 1:
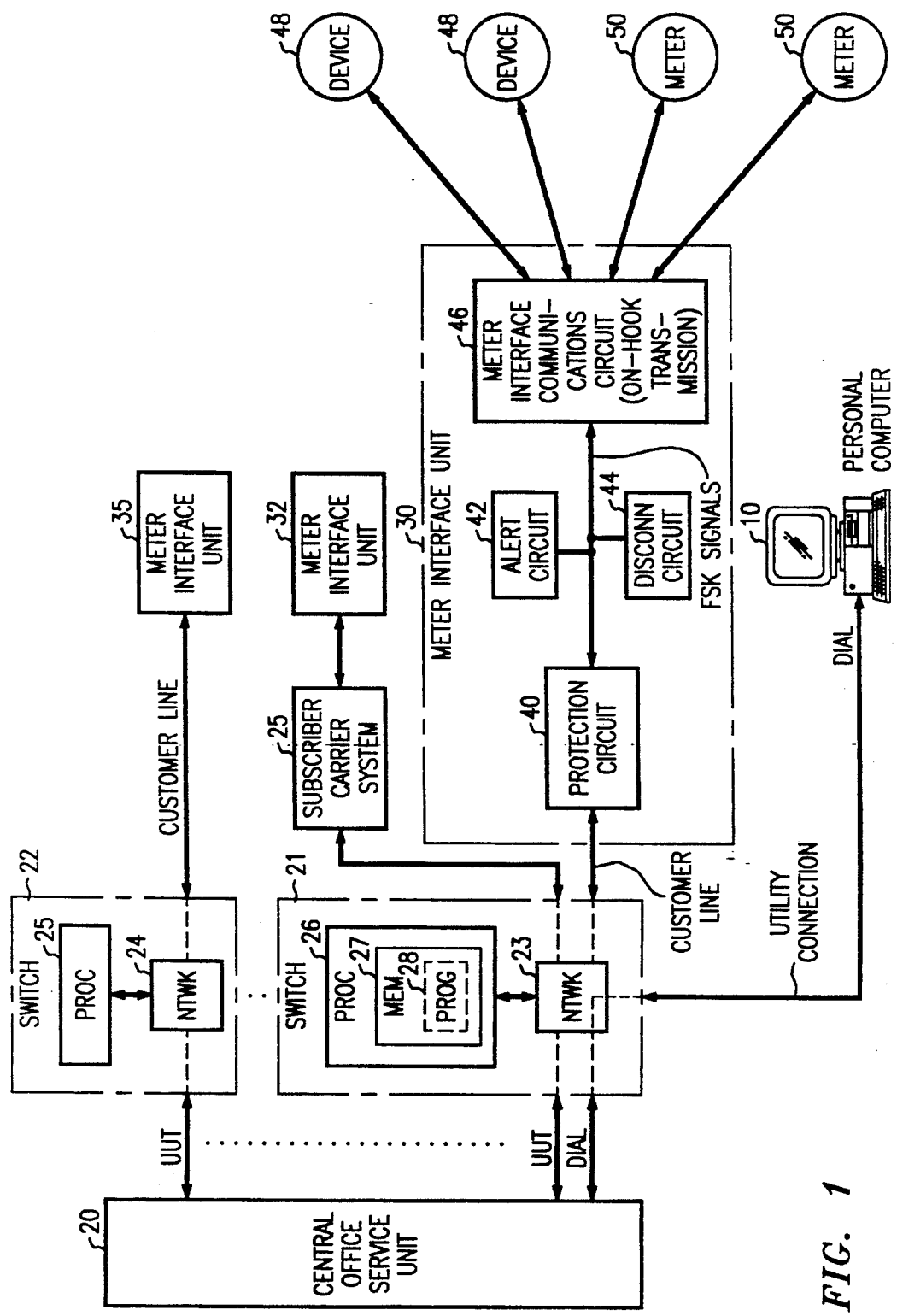
FIG. 1 is a block diagram illustrating connections for accessing customer meters and devices.

FIG. 1 is a block diagram of the operation of applicant's invention. A terminal such as a personal computer 10 at the office of a utility is connected by a line or connected over an interoffice trunk to a telephone switch 21. When an access number is dialed and received from PC 10 in switch 21, a connection is set up to a central office service unit 20. The central service unit is located herein in a first central office that includes switching system (switch) 21. In alternative arrangements, the central office service unit disconnects PC 10 and dials back to access PC 10 in order to guard against tampering of the meter reading and device control process from unauthorized sources. This central office (C.O.) service unit 20 is connected to a plurality of central office switches, such as switch 21 and 22 by utility telemetering trunks which are simple interoffice trunks. Each of the switches 21 and 22, which may be housed in different wire centers, has a switching network, 23 and 24, respectively, for transmitting communications signals, such as voice signals, and including the meter reading and device control signals of this invention. Each of the switches comprises control processor means 26, operative under the control of a program 28, stored in memory 27 for controlling the operations of the switch. In response to signals received from PC 10, C.O. service unit 20 requests utility connections by sending signals similar to the kinds of signals sent for setting up an interoffice call to the appropriate one of switches 21 or 22.

In this specific embodiment, the method used for signaling the request to be connected via a customer line to a particular metering interface unit (MIU) such as MIU 30, MIU 32 or MIU 35 is to send out a string of multifrequency (MF) digits. Such a string of digits usually consists of a key pulse signal (KP), a four, five, seven or ten digit directory number and a start (ST) signal. In response to reception of these digits, a switch such as switch 21 translates the received directory number to identify a meter interface unit such as meter interface unit 30 and sets up a connection via a utility telemetry trunk (UTT), between the central office service unit 20, through a switching network 23 or 24, via a customer line to a MIU 30, 32 or 35.

The utility telemetry trunk has a special class of service which identifies to the connected switch that the requested connection is to be made with ringing suppressed. In response to a received directory number from a UTT, switch 21 sets up a connection with ringing suppressed to MIU 30. Note that a suppressed ringing connection differs from a conventional voice connection, not only in that a ringing signal is not sent and that the line is not monitored for a supervisory signal to stop or "trip" ringing, but that no check is made that a ringing signal is actually flowing to the analog line. The ringing signal and its accompanying checks are a basic and inherent part of any normal telephone connection. For example, even when a facsimile call is completed, wherein no audible bell is heard, the circuits of the terminating facsimile machine respond to the ringing signal that is sent from the switch.

When the suppressed ringing connection to the MIU has been established, MIU 30 is connected to C.O. service unit 20 and receives from that service unit or from PC 10 through the service unit an alert tone to trigger the MIU into the telemetry mode. In accordance with the principles of this invention, wherein a customer's station equipment includes both a voice or other communication station and an MIU, the normal ringing signal alerts the communication station, and, where this is a voice station, thereby alerts the customer, while the tone signal sent over the suppressed ringing connection alerts the MIU. Telemetry and control signals are then exchanged between C.O. service unit 20 or utility controller 10 and MIU 30 and the data received from MIU 30 is transmitted from C.O. service unit 20 to PC 10 for processing by the utility. Similarly, utility control signals are sent from PC 10 to C.O. service unit 20 for transmission to MIU 30 to control devices at the customer's home. If a customer picks up the handset of a telephone station while the communication between the service unit and the meters and/or devices at the customer's location is in progress, these communications are quickly terminated and regular service restored to the customer. An incoming call, however, will receive a busy signal if a utility access call is in progress.

The UTT is a conventional interoffice trunk such as an E & M trunk or a common channel signaling trunk. Such trunks have arrangements whereby a change of supervision at one end is signaled to the other end by a tone (E & M) or by an out of band tone or data signal. Such a trunk passes a supervisory signal, detected at a line circuit and passed by the switch processor to one end of the trunk, to the C.O. service unit to effect a disconnect of that unit when a customer goes off-hook in the middle of a utility access call.

The C.O. service unit is expanded from prior art C.O. service units to be connected by trunks to a plurality of switches, such as switch 21, ..., 22, and is connectable by a plurality of trunks (a trunk group) to each such switch. In some cases, several trunk groups may be connected to one switch, for example, to handle traffic to different groups of SLCs. The C.O. service unit is also connected to a plurality of utilities, only one of which is shown, which simultaneously establish calls to different customers.

While in this embodiment, the utility access unit PC 10 is connected to the MIU through a service unit, an alternate configuration would permit a utility access unit to be connected via a trunk directly to the switching network for connection to the MIU.

The specific embodiment of FIG. 1 uses an analog line, transmitting voice band signals, ringing or tone alerting signals, and using direct current detection of supervision. The term "ringing" as used herein is used for convenience and because of its common use, but is meant to describe any process of customer alerting, including, for example customer tone alerting. For Integrated Services Digital Network (ISDN) lines, supervision and customer alerting signals are transmitted as data signals over the D-channel of the customer line.

FIG. 1 shows details of a meter interface unit. A protection circuit 40 is used to protect the rest of the meter interface unit 30 against damage caused by electrical signals carrying excessively high energy. Effectively, this is over-voltage protection. Such protection circuits are well known in the prior art. Alert circuit 42 is used to detect the initial alerting tones used for signaling a request for a connection to the meter interface communication circuit 46. The alert circuit continuously monitors the line when the line is on-hook in order to detect such signals. When such signals are detected, it activates the meter interface communication circuit which communicates with PC 10 to exchange the reading information from meters and the control information on meters 50 and the control information for controlling devices 48. When a control and/or reading cycle has been completed as determined by the C.O. service unit 20, the C.O. service unit goes on-hook which triggers switch 21 to send a 300 millisecond minimum open loop signal to the MIU to signal a disconnect.

In some cases, certain SLCs such as AT&T's SLC 96 will not transmit a forward disconnect (open). In many cases it will. It depends on the channel units installed. If the disconnect is not forwarded, then the MIU detects the end of data transmission and notifies the C.O. service unit during the data transmission, and the C.O. service unit detects the end of data transmission and disconnects to connecting trunk. Depending on the channel unit inventory situation, the telephone service supplier may wish to allow off-hook transmission. In this case, the MIU detects the end user off-hook signal in order to signal for a disconnect of the suppressed ringing connection. In any case, it is to provide the forward disconnect through the appropriate channel units.

As long as the meter interface unit 30 presents an impedance in excess of approximately 10k ohms to the line, the central office will treat the line as being on-hook. If the customer should pick up his telephone instrument while the communication between the PC and the meter interface unit is going on, switch 21 will detect the off-hook and cause the communication between the PC and the meter interface unit to be aborted by sending a disconnect signal to the MIU and an on-hook signal to the C.O. service unit to terminate the connection.

Arrangements for communicating with on-hook devices such as the meter interface unit 30 are well known in the prior art and are defined, for example, in *Bellcore Technical Reference TR-TSY-000030*, Issue 1, June, 1988.

Figure 2:
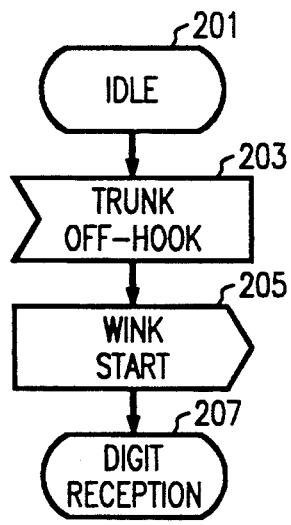
FIGS. 2-6 are flowcharts of actions performed in setting up such connections and in accessing meters and devices.
Figure 3:
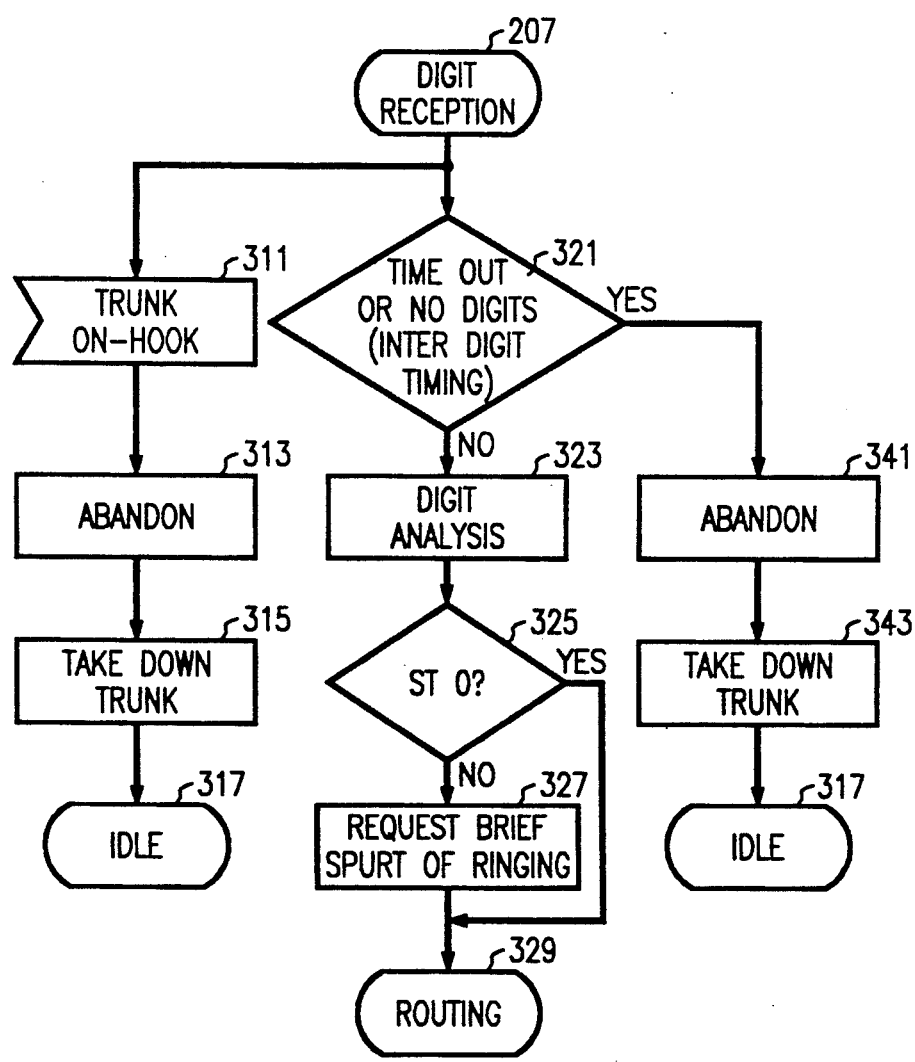
Figure 4:
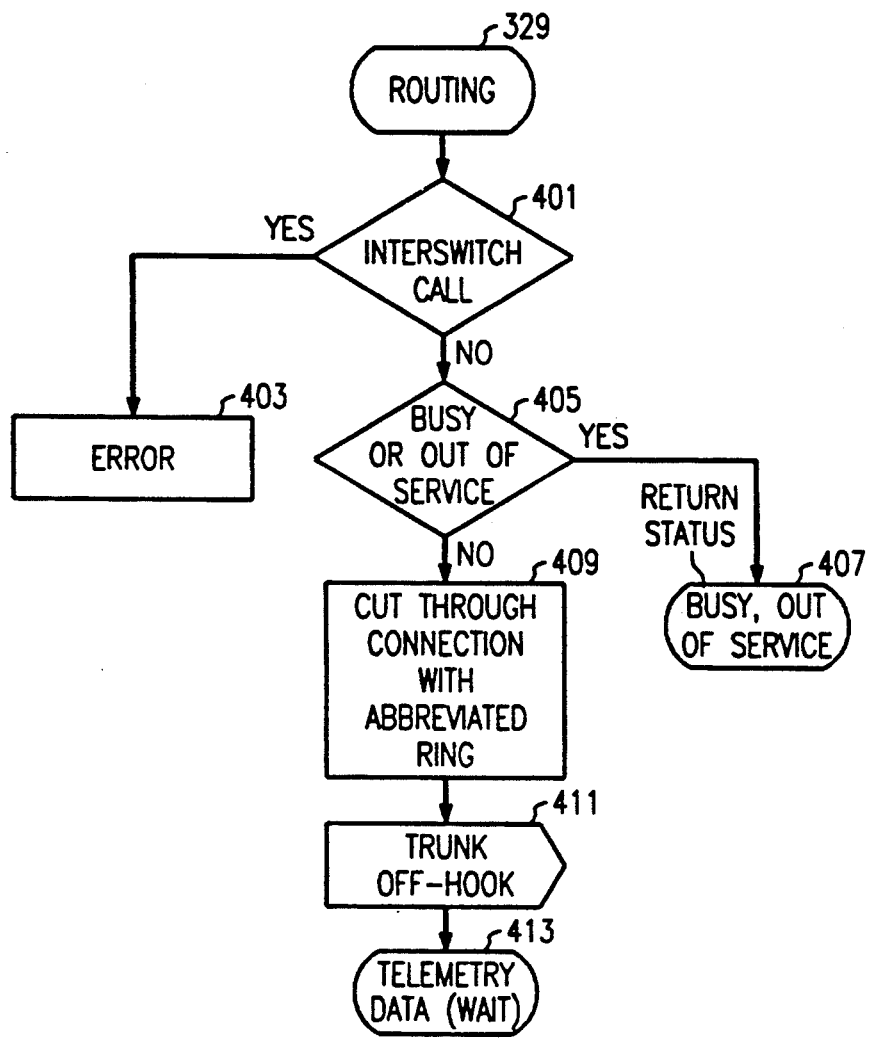
Figure 5:
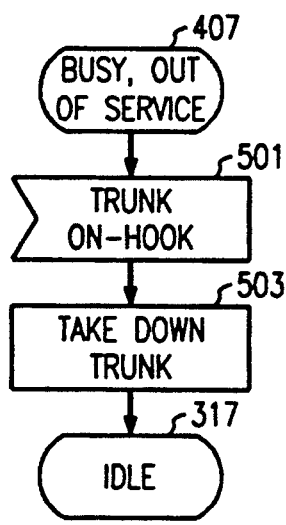

FIGS. 2-6 are flow charts showing the call processing actions that take place while processing a utility telemetry call. FIG. 2 shows the first steps in response to a seizure from a utility telemetry trunk. As shown in FIG. 1, utility telemetry trunks, which are ordinary interoffice trunks, are connectable to different switches. The trunk is originally in the idle state. It goes off-hook (action block 203) and a wink start signal is received from the trunk (action block 205). This is followed by the digit reception state (action block 207). FIG. 3 is a flow chart in response to digit reception. If the trunk goes on-hook during or following digit reception (action block 311), the call is considered abandoned (action block 313) and the trunk is taken down (action block 315) and restored to the idle state (action block 317). If there is a timeout or no digits are received as determined by the tests in the interdigit timing (test 321), then the call is considered abandoned (action block 341), the trunk is taken down (action block 343) and is restored to the idle state (action block 317). If the digits are properly received, the digits are analyzed (action block 323). If the ST signal is the standard ST signal (ST0) as determined in test 325, the routing sequence 329 is entered. Otherwise, the type of alternate ST signal (ST1, ST2, or ST3) is used to determine the length of a requested burst of ringing and this burst of ringing is requested for application after a connection has been set up to the requested meter interface unit. In this specific example, the length of the bursts are 20, 40 and 60 ms.; further experimentation may indicate that other lengths, such as 50, 100 and 150 ms. may be preferable to take into account, for example, variations in the ability to control the length of a burst. The best arrangement is to permit the length of the burst to be a parameter controllable by the translation recent change facility of modern switches. If more than 3 different lengths (plus 0 length) are required, different groups of utility trunks are used for different groups of ringing burst lengths; for example, group A could be used for 0, 20, 40 or 60 ms. bursts, while group B could be used for 0, 80, 100 and 120 ms. bursts. The burst of ringing is used in the SLC to assign a time slot for the connection to the customer's MIU, but is sufficiently short that it is completed before the connection is actually made; thus, no ringing signal is sent to the MIU. Thereafter, the routing sequence 329 is performed. FIG. 4 is a flow diagram of the steps of the routing sequence. First, a determination is made by test 401 whether the call is an interswitch call. If so, this indicates an error 403 since the utility telemetry trunk used on the call is supposed to be connected to the switch serving the requested meter interface unit. If this is not an interswitch call, then test 405 determines whether the called customer associated with the requested meter interface unit is busy or out of service. If so, then the busy or out of service status is returned to the trunk control program and further actions are performed as described in FIG. 5. If the called customer line is not busy or out of service, then the connection is cut through if necessary with the abbreviated ring as derived in block 327 (action block 409). When the call is cut through to the end user, a trunk off-hook signal is returned to the C.O. service unit 20. The trunk then goes into the telemetry data wait state (413). FIG. 5 describes the actions performed if the called customer associated with the requested meter interface unit is busy or out of service (state 407). An on-hook signal is sent over the utility telemetering trunk to the C.O. service unit 20 (action block 501) and the trunk is taken down (action block 503). The trunk is then in the idle state (317).

In the telemetry data wait state, it is the responsibility of the C.O. service unit, responsive to signals from the utility controller or internally triggered, to alert the MIU. Using today's equipment, the MIU is alerted by one of 13 single frequencies. Once the MIU has been alerted, other signals such as frequency shift keyed data signals can be used for communicating with the MIU. The end user cannot alert the MIU because the user's station equipment does not have a one-of-13 single frequency generator and, further, the call would be taken down if the end user went off hook.

Figure 6:
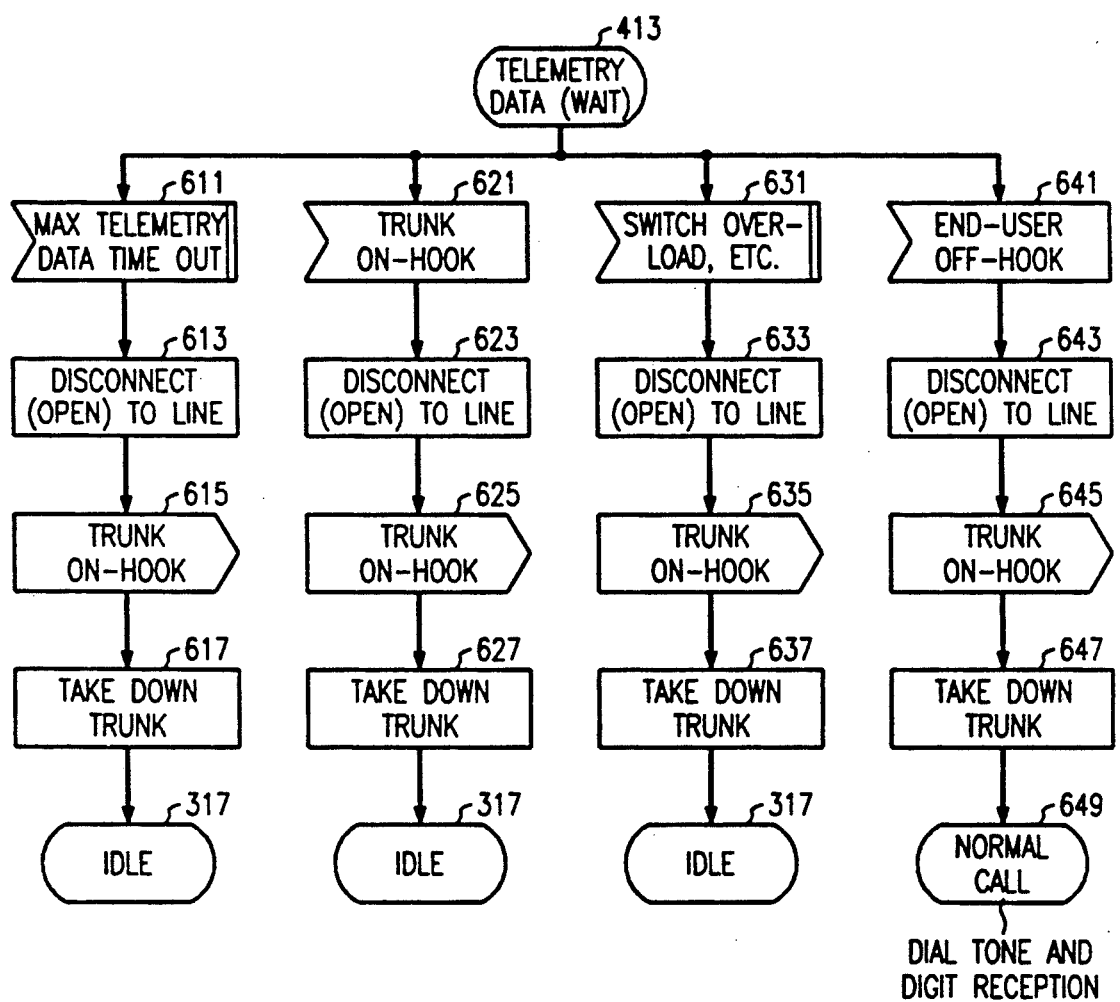

FIG. 6 is a flow diagram of the actions performed in response to various timeout conditions and in response to disconnect signals. The switch is in a wait state (413) during the telemetry connection. If a maximum interval such as 10 or 20 seconds is exceeded (action block 611), the customer's line is disconnected and a signal is sent to the MIU to disconnect (action block 613), an on-hook signal is sent over the utility telemetering trunk to the C.O. service unit (action block 615) and that trunk is taken down (action block 617) and restored to the idle state (317). The same disconnect functions are performed upon completion of a telemetry access call. A billing record is then made in the same way as a billing record is made for a conventional (voice) call. If an on-hook signal is detected on the utility telemetering trunk, indicating a disconnect from the utility side (action block 621), then the line connected to the metering interface unit is disconnected (action block 623), the utility telemetering trunk is sent an on-hook signal (action block 625), the trunk is taken down (action block 627), and restored to idle (317). If an overload or other condition is detected in the switch, indicating that telemetering activities should be temporarily suspended (action block 631), then the customer's line is disconnected (action block 633), an on-hook signal is sent over the utility telemetering trunk (action block 635), that trunk is taken down (action block 637) and restored to the idle state (317). If the end user goes off-hook during the telemetering interval because the end user wishes to place a call (action block 641), then the line is to be disconnected from the telemetering connection, a disconnect is sent from the switch to the MIU (action block 643), the utility telemetering trunk is sent an on-hook (action block 645) and the trunk is taken down (action block 647). The end user is then prepared to be processed in the normal way by receiving dial tone and placing this call by dialing the appropriate digits (state 649).

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A telephone switching system comprising:
   a switching network for interconnecting a multiplicity of telecommunications trunks and another multiplicity of analog customer lines;
   at least one of said trunks connectable to a utility data accessing device for accessing a customer premises device; and
   processor means operative under the control of a program for translating a class of service of said at least one of said trunks, and responsive to said translating, for establishing a connection through said network without transmitting ringing signals to an analog customer line.

2. The switching system of claim 1 wherein tone signals are transmitted over said connection to alert a device at customer station equipment.

3. The telecommunications system of claim 1 wherein frequency shift keyed signals are transmitted over said connection for exchanging data with a device at a customer premises.

4. The telecommunications system of claim 1 wherein said processor means are further operative under the control of a program for making billing record of said connection, said process of making a billing record being essentially the same as a process for making a billing record of a voice call.

5. The telecommunications switching system of claim 1 wherein said processor means is further operative under the control of said program for detecting an off-hook signal from a customer station connected over said connection and responsive to a detection of said off-hook signal for disconnecting said connection.

6. A method of accessing a customer premises device from a data accessing device via a telecommunications switching system said telecommunications switching system comprising a voice band signal switching network for switchably interconnecting multiplicities of inlets and multiplicities of outlets, said inlets for connection to interoffice telecommunications trunks, said outlets for connection to analog customer lines, the method comprising:
   determining that a class of service for an inlet connected to said data accessing device is a class of service requiring establishment of a suppressed ringing connection;
   establishing a suppressed ringing connection from said inlet to an outlet of said voice band signal switching network for connecting said data accessing device to an analog customer line connected to station equipment of a customer; and
   transmitting signals over said suppressed ringing connection for accessing said customer premises device over said analog line from said data accessing device.

7. The method of claim 6 further comprising:
   establishing a connection from said data accessing device to said inlet prior to said establishing said suppressed ringing connection.

8. The method of claim 7 wherein said connection from said data accessing device is established over an interoffice trunk.

9. The method of claim 6 wherein said transmitting comprises transmitting tone signals.

10. The method of claim 6 wherein said transmitting comprises transmitting frequency shift keyed signals through said network.

11. The method of claim 6 further comprising:
    establishing a connection between said data accessing device and a central office service unit, connectable to said network.

12. The method of claim 11 wherein said establishing a connection between said data accessing device and said central office service unit comprises establishing a connection from said accessing device to said central office service unit over an a customer line.

13. The method of claim 11 wherein a plurality of switches in different wire centers is connectable to said service unit.

14. The method of claim 11 further comprising the step of establishing a plurality of simultaneous suppressed ringing connections in one of said plurality of switches from said service unit to a plurality of customer stations.

15. The method of claim 6 further comprising the step of:
    making a billing record for said suppressed ringing connection in essentially the same manner as making a billing record for a voice call.

16. The method of claim 6 further comprising the step of:
    detecting an off-hook signal on said suppressed ringing connection for disconnecting said suppressed ringing connection.

17. The method of claim 6 wherein said establishing comprises establishing a connection for connecting to a meter interface unit.

18. The method of claim 17 wherein said meter interface unit is also connected to a controllable device and wherein said transmitting further comprises transmitting signals for controlling said controllable device over said connection.

19. A method of accessing a customer premises device from a data accessing device via a telecommunications switching system, said telecommunications switching system comprising a switching network for switchably interconnecting multiplicities of inlets and multiplicities of outlets, said inlets for connection to interoffice telecommunications trunks, said outlets for connection to customer lines, the method comprising:

determining that a class of service for an inlet connected to said data accessing device is a class of service requiring establishment of a suppressed ringing connection;

establishing a suppressed ringing connection from said inlet to an outlet of said switching network for connecting said data accessing device to a customer line connected to station equipment of a customer; and transmitting signals over said suppressed ringing connection for accessing said customer premises device over said customer line from said data accessing device.

* * * * *